US008373544B2

(12) United States Patent
Pitt-Pladdy (10) Patent No.: US 8,373,544 B2
(45) Date of Patent: Feb. 12, 2013

(54) RFID APPARATUS

(75) Inventor: Glen Pitt-Pladdy, Wokingham (GB)

(73) Assignee: Innovision Research & Technology PLC, Cirencester (GB)

( * ) Notice: Subject to any disclaimer, the term of this patent is extended or adjusted under 35 U.S.C. 154(b) by 1617 days.

(21) Appl. No.: 10/577,504

(22) PCT Filed: Oct. 29, 2004

(86) PCT No.: PCT/GB2004/004572
§ 371 (c)(1),
(2), (4) Date: May 11, 2007

(87) PCT Pub. No.: WO2005/045744
PCT Pub. Date: May 19, 2005

(65) Prior Publication Data
US 2008/0018433 A1    Jan. 24, 2008

(30) Foreign Application Priority Data

Oct. 29, 2003  (GB) .................................. 0325249.1
Mar. 5, 2004   (GB) .................................. 0405026.6

(51) Int. Cl.
*H04Q 5/22* (2006.01)
(52) U.S. Cl. ..................... 340/10.4; 340/10.1; 340/10.5; 455/41.2; 455/66.1; 455/410; 455/411
(58) Field of Classification Search ................. 340/10.4, 340/10.1, 10.5, 572.1; 455/41.2, 66.1, 410, 455/411; 370/330, 337, 466; 330/288, 297; 709/203, 217, 202
See application file for complete search history.

(56) References Cited

U.S. PATENT DOCUMENTS

| | | | | |
|---|---|---|---|---|
| 5,317,309 | A | 5/1994 | Vercellotti et al. | 340/10.5 |
| 5,649,295 | A * | 7/1997 | Shober et al. | 340/10.1 |
| 6,697,345 | B1 * | 2/2004 | Corrigan et al. | 370/330 |
| 6,892,052 | B2 * | 5/2005 | Kotola et al. | 455/41.2 |
| 6,978,118 | B2 * | 12/2005 | Vesikivi et al. | 455/41.1 |
| 7,072,672 | B1 * | 7/2006 | Vanska et al. | 455/456.3 |
| 7,274,909 | B2 * | 9/2007 | Perttila et al. | 455/41.2 |
| 7,333,479 | B2 * | 2/2008 | Jalkanen et al. | 370/352 |
| 7,446,646 | B2 * | 11/2008 | Huomo | 340/10.1 |
| 7,548,153 | B2 * | 6/2009 | Gravelle et al. | 340/10.3 |
| 7,565,108 | B2 * | 7/2009 | Kotola et al. | 455/41.2 |

FOREIGN PATENT DOCUMENTS

| | | |
|---|---|---|
| WO | WO9522138 | 8/1995 |
| WO | WO03079281 | 9/2003 |
| WO | WO03081787 | 10/2003 |

* cited by examiner

*Primary Examiner* — Nam V Nguyen
(74) *Attorney, Agent, or Firm* — Sterne, Kessler, Goldstein & Fox PLLC (57) ABSTRACT

RFID apparatus includes transmission means for transmitting an RF signal; reception means for receiving a modulated RF signal; and demodulation means for demodulating a received modulated signal. The apparatus comprises generating means for generating a RF signal dependent on an incoming RF signal, the incoming RF signal being generated by different apparatus, and the apparatus is arranged to transmit the generated RF signal such that the generated RF signal interferes with the incoming RF signal. The RFID apparatus has both the means to respond to an RF reader device, in tag emulation mode, and means to function as an RF reader device, in reader mode.

17 Claims, 8 Drawing Sheets

RFID APPARATUS

FIELD OF THE INVENTION

The present invention relates to radio-frequency identification (RFID) apparatus. The term "RFID" as used herein should be understood to include both traditional RFID systems, in which an RFID tag is used for identification, other systems such as near field communications (NFC) systems, and other similar systems which are for the storage and retrieval of data and/or commands, and not necessarily only for identification purposes.

BACKGROUND OF THE INVENTION

The growth and diversity of RFID applications is progressing at an exponential rate and now includes NFC systems. The existing RFID system concepts, based on isolated reader and tag functionality, do not necessarily provide the optimum system level solution for an ever-increasing diversity of application areas. Many of these emerging application areas may require each element within the RFID or NFC system to possess dual mode reader/tag functionality or dual activity.

Several technical problems need to be addressed to realise a dual mode reader/tag functionality in which both reader and tag functionality exist within the same apparatus.

In known RFID architectures, reader and tag antenna functionalities are quite different. Dual mode reader/tag functionality could be achieved using two separate antennas, one for the reader functionality and one for the tag functionality within any system. However, close proximity of the antennas will result in interference between the antennas. This effect is especially acute for proximity or vicinity coupled systems where the coupling mechanism is magnetic. A solution to this problem would involve either positioning the antennas at mutual magnetic nulls, or including an enable/disable function so that each antenna would be disabled when not in use. The former would have the difficulty of the null being moved by external influence, the latter would never be completely disabled due to parasitism in components. These solutions also result in increased complexity, cost and size of the dual mode solution.

It would also be desirable to provide a dual mode reader/tag which can be implemented such that pre-existing readers do not need to be changed to ensure interoperability.

SUMMARY OF THE INVENTION

In accordance with the present invention, there is provided RFID apparatus comprising:

transmission means for transmitting an RF signal; reception means for receiving a modulated RF signal; and demodulation means for demodulating a received modulated signal, wherein the apparatus comprises generating means for generating a RF signal dependent on an incoming RF signal, said incoming RF signal being generated by different apparatus, and wherein the apparatus is arranged to transmit said generated RF signal such that said generated RF signal interferes with the incoming RF signal.

Embodiments of the present invention provide MD apparatus having an RF reader architecture, which can additionally emulate RF tag functionality.

The present invention enables a single antenna solution, which solves the problem of there being inherently different properties of the antennas used for individual reader and/or tag functionality. The use of an internal generating means for generating an RF signal dependent on the incoming RF signal provides an arrangement whereby it is possible to emulate tag functionality without needing a conventional tag antenna arrangement.

Further, the invention has the advantage that a dual mode apparatus according to the invention can be implemented such that pre-existing readers do not need to be changed to ensure interoperability.

Use of the present invention can also avoid range reduction due to insufficient modulation depth; modulation depth can be achieved by appropriate control of the generation means.

The generating means preferably includes phase sensitive means responsive to phase in the incoming RF signal so that the phase of the generated RF signal can be controlled relative to that of the incoming RF signal. The generating means may comprise a phase locked loop, for example a second order phase locked loop.

Embodiments of the invention can be used to achieve maximum range performance, with minimal increase in circuit complexity, and without a significant size or cost penalty compared to a conventional single mode reader/tag system.

Additional advantages of the invention include reduced silicon area and reduced power consumption, compared to a dual mode system in which the reader and tag circuitry is separated.

Further features and advantages of the invention will become apparent from the following description of preferred embodiments of the invention, given by way of example only, which is made with reference to the accompanying drawings.

DETAILED DESCRIPTION OF THE INVENTION

The apparatus of the present invention may be used either itself as a reader and tag emulation apparatus, whether in hand-held form or other form or alternatively it may form part of a larger device, such as a consumer electronic device, mobile telephone or personal digital assistant. When forming part of a larger device, such apparatus may be included as a discrete unit, be integrated within the electronic circuitry of the larger device or alternatively use parts of the electronic circuitry and parts within the larger device.

The apparatus of the present invention operates in two modes, referred to herein as 'reader' mode and 'tag emulation' mode. The apparatus will be referred to herein as a dual mode apparatus, although it should be understood that more than two modes may be provided. The dual mode apparatus may be set up to operate in either mode as default. The change in mode of operation may be due to operation of the larger device, receipt of an externally generated RF signal by the dual mode apparatus or as a result of some instruction received from within the dual mode. Preferably the dual mode apparatus will be set to operate in 'tag emulation' mode as default as this has the advantage of saving power within the apparatus or larger device. In one embodiment the dual mode apparatus may automatically switch to 'reader' mode at certain time intervals or on receipt of a signal, for example from the larger device. The switch may also occur as the result of the detection of an externally generated RF field, for example by an active tag system. As an alternative, the dual mode apparatus could operate as a default in reader mode but transmit its RF signals at pre-defined intervals rather than continuously. The switch to tag emulation mode may then occur on detection of an externally generated RF signal, for example from another RF reader device.

Figure 1:
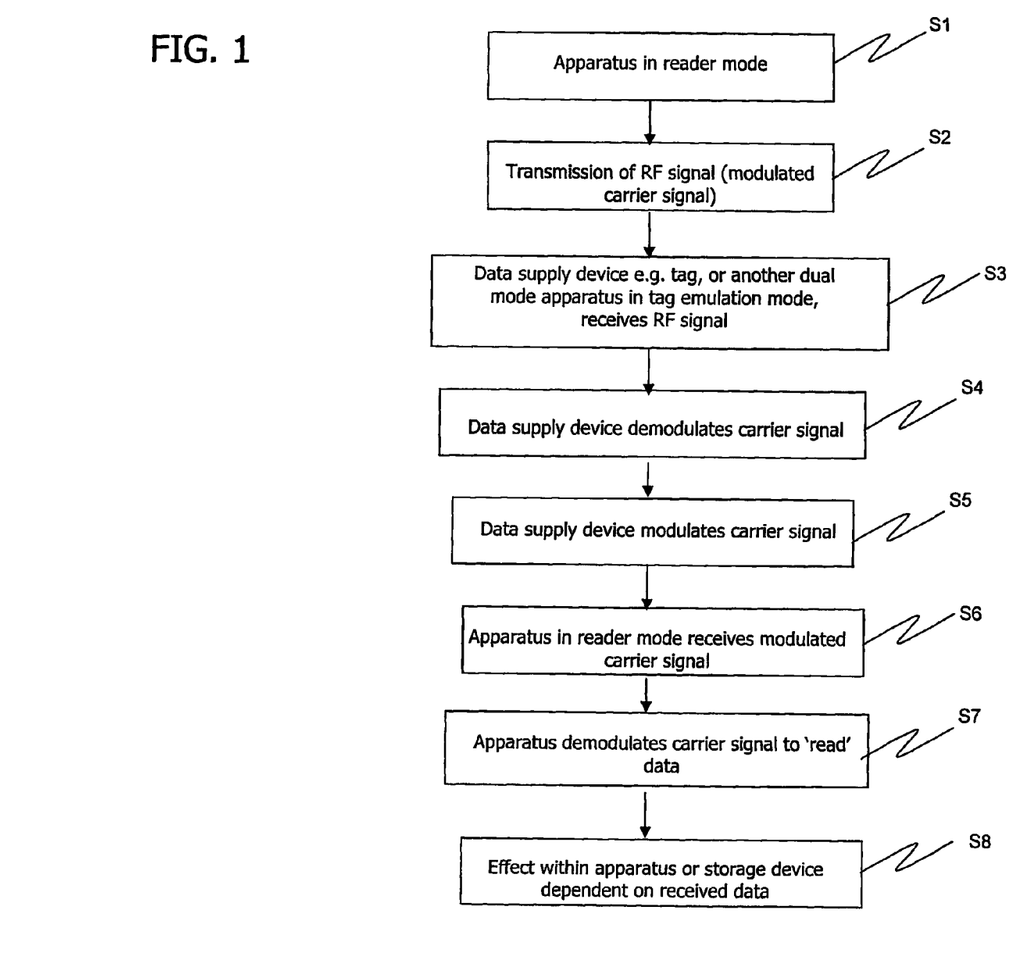
FIG. 1 is a flow diagram describing the operation of the apparatus of the present invention in reader mode.

FIG. 1 shows a flow diagram of one embodiment of the operation of the apparatus in reader mode. At S1 the apparatus is in reader mode. As such it will be transmitting an RF carrier signal. This signal may or may not be modulated (S2). The modulation will be effected by the apparatus in reader mode according to data and/or commands to which it has access (either within the apparatus itself or within the larger device). Should there be a data supply device (tag or second dual mode apparatus in tag emulation mode) within the range of the transmitted RF signal, the transmitted RF signal together with any modulated carrier signal will be received by the data supply device (S3). The data supply device will then demodulate the incoming carrier signal, thereby reading the data and/or commands. As a result of the received data and/or commands, the data supply device will modulate the carrier signal supplied by the apparatus in accordance with the data in or available to such data supply device (S4). The apparatus will then receive such modulated carrier signal (S6) and demodulate the carrier signal to obtain the data (S7). Depending on the data obtained, activity or functionality or operation of the apparatus or larger device will be accordingly affected (S8).

Figure 2:
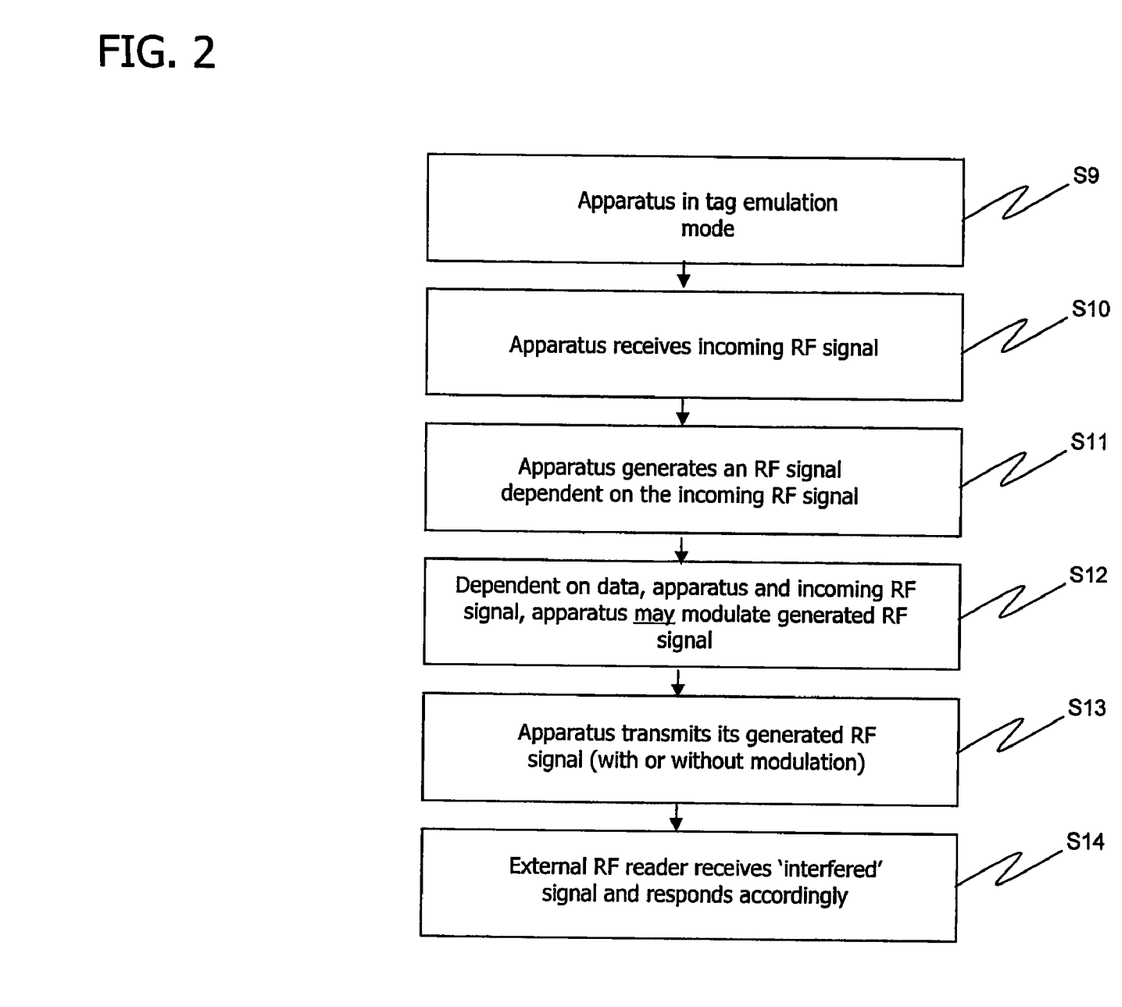
FIG. 2 is a flow diagram describing the operation of the apparatus of the present invention in tag emulation mode.

FIG. 2 shows a flow diagram of one embodiment of the operation of the apparatus in tag emulation mode. At S9 the apparatus is in tag emulation mode. The apparatus of the invention will receive an incoming, externally generated RF signal when it comes into the range of such a signal (S10). Such RF signal may be generated by a second apparatus of the present invention or alternatively a standard RF reader. Such signal may or may not comprise a modulated carrier signal. On receipt of the incoming RF signal the apparatus will generate its own RF signal dependent on the characteristics of the incoming RF signal (S11). The generation means is preferably sensitive to the phase of the incoming RF signal. Such phase sensitivity can be achieved by the use of a phase lock loop mechanism, described in more detail below, or other phase coherent detection or phase sensitive detection systems. Such generation could also include digital generation means. Dependent on the data and/or commands available to the apparatus and dependent on the incoming RF signal the apparatus may then modulate the internally generated RF signal (S12). The apparatus will then transmit the generated RF signal (S13). Transmission may occur once the correct internal RF signal has been generated. Alternatively such transmission may occur at a particular time, for example dependent on various standard protocols. The transmitted RF signal will interfere with the incoming RF signal. It is this interference which the external reader or second apparatus will receive (S14) and its response will follow that of a standard RF reader response (see for example FIG. 1).

Figure 3:
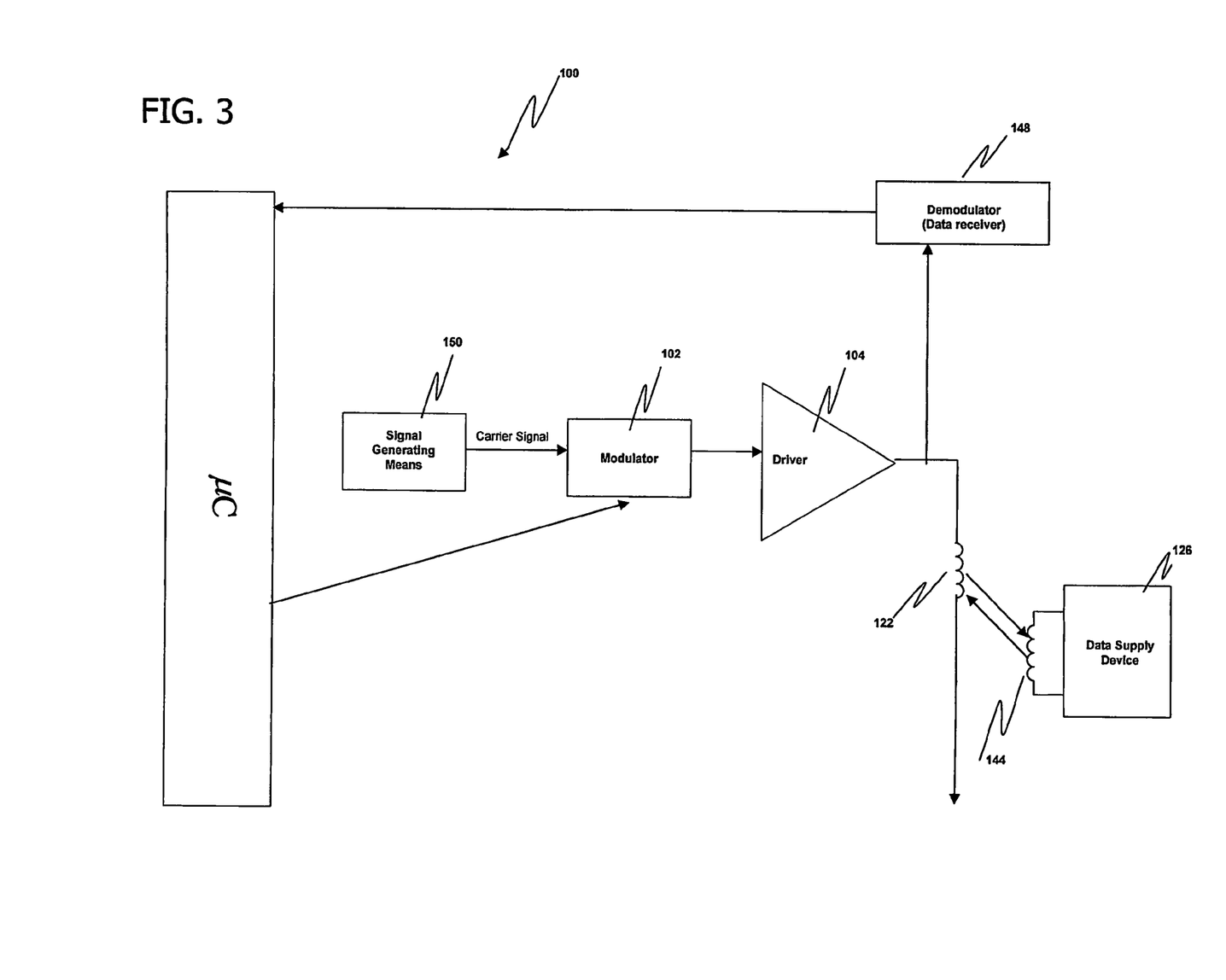
FIG. 3 is a circuit diagram of elements, used in reader mode, of an apparatus according to a first embodiment of the present invention
Figure 4:
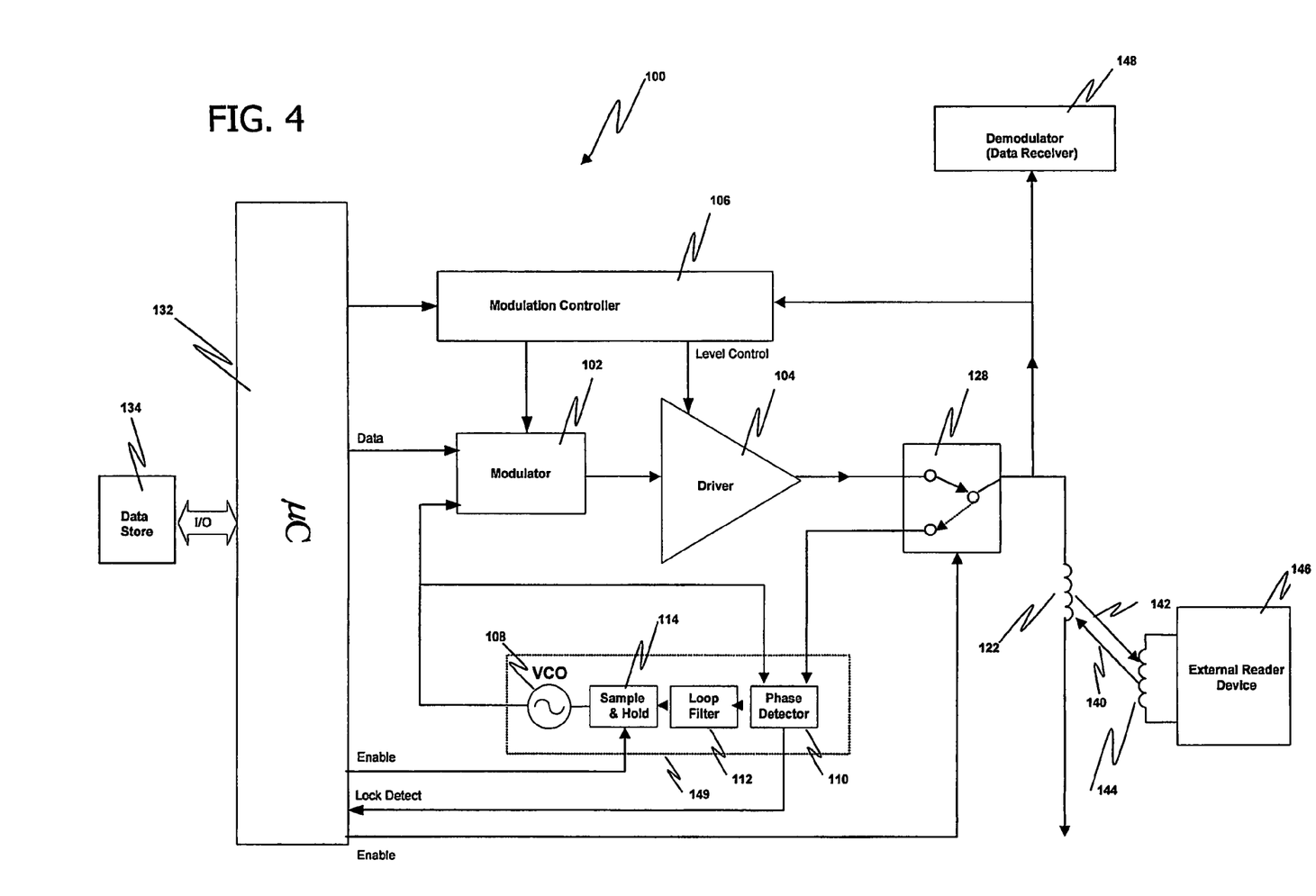
FIG. 4 is a circuit diagram of elements, used in tag emulation mode, of an apparatus according to a first embodiment of the present invention.

FIGS. 3 and 4 are circuit diagrams showing elements of the apparatus used in reader and tag emulation modes, respectively, according to a first embodiment of the present invention. Some elements, referenced with a reference numeral which is unique to one of FIGS. 3 and 4, are used in only one of the modes. Other elements, which are referenced with the same reference numerals in both FIGS. 3 and 4, are used in each mode; it should be understood that, whilst the re-use of components in both modes is preferable, in alternative embodiments of the invention, such shared elements may be replaced by separate components which are each used in only one mode. FIG. 3 is a circuit diagram of the apparatus according to a first embodiment of the present invention in reader mode. The elements used in reader mode 100 include a microcontroller 132, a modulator function 102, a driver function 104, an antenna 122, a data receiver and demodulator 148.

A data supply device 126 (for example an RF tag or second dual mode apparatus of the present invention) interacts with the apparatus 100 by employing available radio-frequency signals used in RFID applications and NFC systems. For example in this embodiment RF signals at 13.56 MHz are used to communicate between the apparatus and data supply device.

The dual mode apparatus in reader mode is arranged to have generating means 150 for generating an RF carrier signal. The apparatus uses a modulator 102 to modulate the generated carrier signal, if required, in accordance with the data and/or commands available to it, for example from the microprocessor 132. The carrier signal (whether modulated or not) is then transmitted via antenna 144. Following transmission the modulated carrier signal is received by a data supply device 126 by antenna 144 and demodulated by such data storage device. Preferably such communication between the dual mode apparatus and data supply device will be through inductive coupling means. Dependent on such demodulated signal and the data and/or commands available to the data storage device, the data supply device 126 is arranged to modulate the incoming carrier signal in accordance with such data and/or commands. On receipt of such modulated carrier signal by the dual mode apparatus, the apparatus 100 is arranged to have means 148 to demodulate such carrier signal and read data or commands supplied by data storage device.

FIG. 4 is a circuit diagram of elements of the apparatus used in tag emulation mode, according to the first embodiment of the present invention. The apparatus 100 includes a micro-controller 132, a modulator function 102, a driver function 104, an antenna 122 and a phase-locked loop 149 comprising in this embodiment a voltage controlled oscillator (VCO) 108, a phase detector 110, a loop filter 112 and preferably a sample and hold circuit 114. Although shown separately in FIGS. 3 and 4, the modulator and driver functions 102 and 104 may be comprised within the same component. Additionally the dual mode apparatus may include a switch 128, which indirectly controls the operational mode (i.e. whether reader or tag emulation) through coupling of incoming RF signal to phase lock loop mechanism and means 106 for controlling the modulation or RF signal output level. The apparatus will also have access to, whether within itself (for example as part of the microcontroller) or as part of a separate component or larger device, a data store 134.

The dual mode apparatus operates with a power supply (not represented). Such power supply may be specific to the apparatus itself, it may be dependent on the mode of operation or the apparatus may use a pre-existing power supply within a larger device. For example when in tag emulation mode, the apparatus may derive power from its own internal power supply, from the power supply in a larger device of which it is a part or from an externally generated RF field or signal.

A reader device 146 (for example an RF reader or second dual mode apparatus of the present invention) interacts with the apparatus 100 by employing available radio-frequency signals used in RFID applications and NFC systems. For example in this embodiment RF signals at 13.56 MHz are used to communicate reader to tag or tag emulator.

In tag emulation mode, the apparatus receives an RF signal from an external reader device 146, or second dual mode apparatus. Such RF signal will be received when the apparatus is within range of the external reader device 146. In a preferred embodiment tag emulation mode is the default mode. Where the default mode is not tag emulation or where the apparatus is in reader mode then the apparatus has means to switch from reader mode into tag emulation mode. Such means might comprise a switch 128. Such means might operate on direction from the microprocessor 132 either as a result of RF signal detection, a return to default mode or a signal supplied from larger device. Alternatively the apparatus can be set up to automatically convert into tag emulation mode on receipt of an RF signal by the antenna 122.

Where a switch 128 is present, the switch is set to connect the antenna 122 with the phase-locked loop 149 of the dual mode apparatus 100. Once in tag emulation mode the VCO 108 will continuously generate an internal RF signal. The phase-locked loop 149, which is preferably a second order loop, comprises means by which the internally generated RF signal is brought into phase with the received (externally generated) RF signal. In a preferred embodiment, the VCO 108 is connected to the phase detector 110 via a loop filter 112 and a sample and hold circuit 114. The phase detector 110 detects the difference in frequency and phase between the VCO generated RF signal and the received RF signal. A signal is then sent from the phase detector to the loop filter resulting in an adjustment to the voltage generated by such loop filter. This in turn adjusts the phase and frequency of signal generated by the VCO. This process is continuously repeated to ensure the VCO signal and external RF signal match.

The phase lock loop process will continue until an instruction to modulate and transmit the internally generated RF signal is received from the microprocessor. This may occur once phase locking between the external RF signal and VCO generated signal has been detected by microprocessor 132. Alternatively, this may occur once the apparatus is ready to transmit and modulate, for example at a time interval prescribed by operating protocols such as ISO 14443.

Where the apparatus includes a sample and hold circuit 114 this will be enabled at the same time as the phase lock loop ceases to operate.

The apparatus 100 is then arranged to modulate and transmit the VCO generated RF signal similar to the manner in which the carrier signal is transmitted by the apparatus in reader mode as described above, and the relevant description thereof above should be understood to apply.

Different types of modulation or interference or combinations of modulation/interference are possible for the transmission of the VCO generated RF signal, e.g. in-phase only causing constructive interference, out-of phase only causing destructive interference, a combination of in- and out-of phase, partially in- and/or out-of phase or a combination of partially in- and/or out-of phase.

In one alternative embodiment, the apparatus includes a modulation controller 106. The modulation controller 106 controls the amplitude of the modulated carrier signal or modulated VCO generated signal in accordance with either the proximity of the external reader device, and/or the characteristic of the received RF signal or and/or the proximity of the data storage device. Where the modulation controller uses detection of external signal strength this can be implemented by providing an amplitude levelling loop having a signal strength detector block (similar to that shown in FIG. 5 as element 230) which captures a sampled measurement of the incoming RF signal strength. The strength information can be used, within the micro-controller 132 and modulation controller 106, in conjunction with other calibration or predictive data if required, to set and control the modulation depth, with the modulator 102 and the driver 104, to a desired value using for example a modulation controller algorithm. This desired value could be a constant, or varying, modulation depth of between, for example, 10% and 100%.

In FIG. 4, the modulated VCO generated signal 142 on transmission is set to cause destructive or constructive interference or a combination of both with the received RF signal on transmission from antenna 122 to the external reader device 146 via the antenna 144.

Once transmission is completed by the apparatus in reader mode, the apparatus mode can be toggled back into tag emulation mode, for example through the switch 128.

Figure 5:
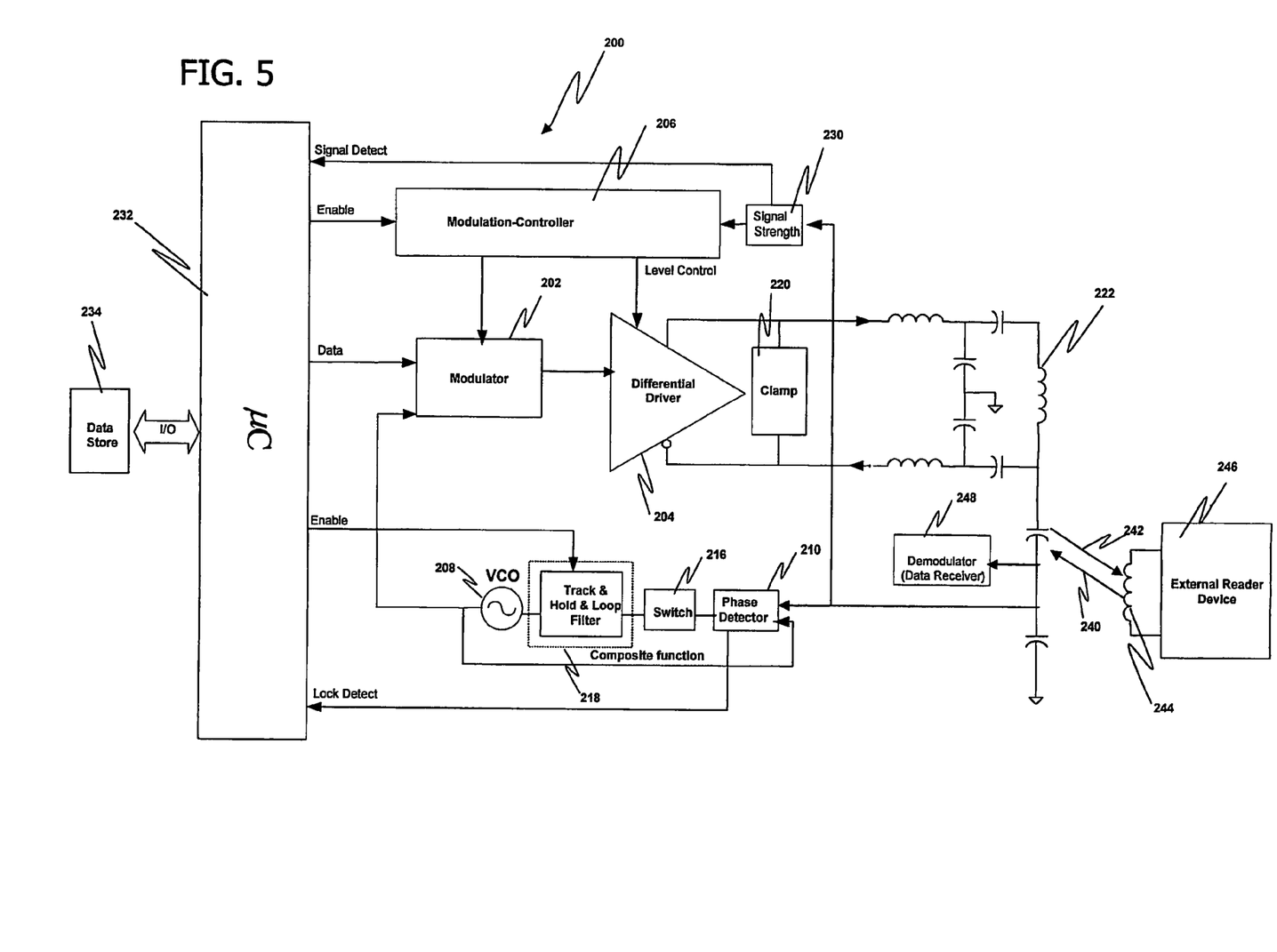
FIG. 5 is a circuit diagram of elements, used in tag emulation mode, of an apparatus according to a second embodiment of the present invention.

FIG. 5 is a circuit diagram of elements used in tag emulation mode in dual mode apparatus according to a second embodiment of the present invention. The reference numbers of similar components to FIG. 4 have been incremented by 100, and the relevant description of those components above should be taken to apply. Further, although not illustrated, elements used during operation of the device in reader mode will be similar to those illustrated in FIG. 3 above, and the relevant description of those components above should be taken to apply.

As described above, operation of the apparatus will depend on whether the apparatus is in reader or tag emulation mode. In addition to the first embodiment, apparatus of the second embodiment additionally includes a clamp 220 and a composite loop filter and hold function 218. The composite loop filter and hold function 218 replaces the loop filter and sample & hold components in FIG. 4 of the previous embodiment.

The clamp 220 is used to reduce the risk of high voltages destroying chip functionality. In circumstances where high voltages might or do occur, for example when the apparatus is in the field of another RF reader device, current is diverted through the clamp thereby preventing high voltages from affecting the chip functionality.

Figure 6:
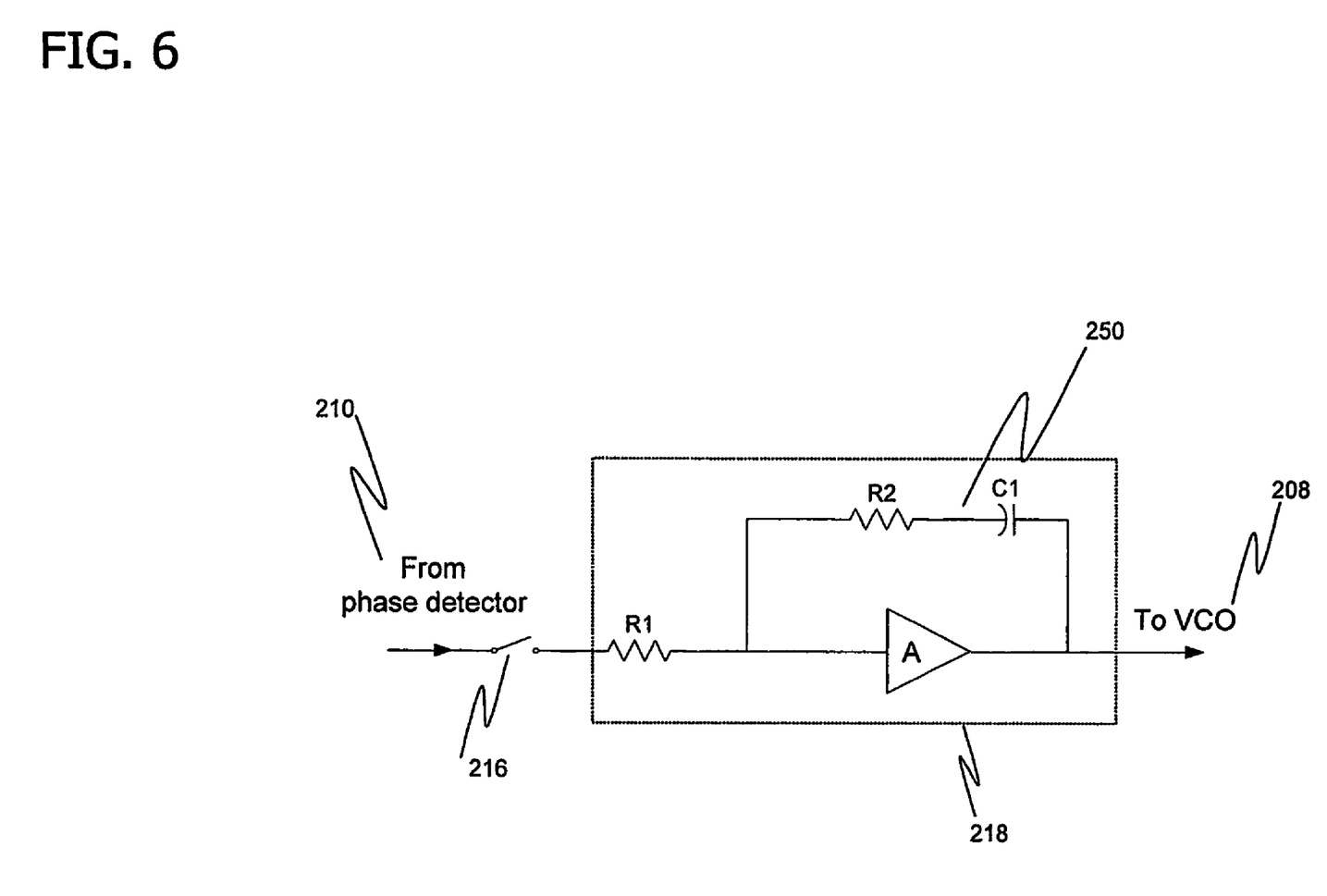
FIG. 6 is a circuit diagram of functional elements of the phase lock loop shown in FIG. 5.

The composite loop filter and hold function 218 is detailed further in FIG. 6.

When activated the VCO 208 continuously generates an internal RF signal. Likewise the phase detector 210, whilst active, continually detects the phase difference between the internally generated signal and any external RF signal and signals the loop filter to increase voltage. In the first embodiment, when the apparatus switches back to reader mode to modulate and transmit the internally generated signal, the phase detector and loop filter continue to operate. This continued operation results in a slow recovery once a new external RF signal is received and the apparatus is operating again in tag emulation mode. In this embodiment, the composite loop and function is placed into hold mode by opening a switch 216 of FIG. 6. When open, the filter can be approximated as a floating integrator whose capacitive element C1, referenced 250, will hold its state as per the last signal received from the phase detector, neglecting any further signals sent by the phase detector. This function can be better described as a "filter and hold function". The filter may be commanded into hold mode only when the phase lock loop has completely stabilized and the output of the phase detector 210 is no longer changing. Alternatively the command can be linked to the modulation and transmission of the VCO signal, for example as required under various communication protocols or as determine by the microprocessor.

Figure 7:
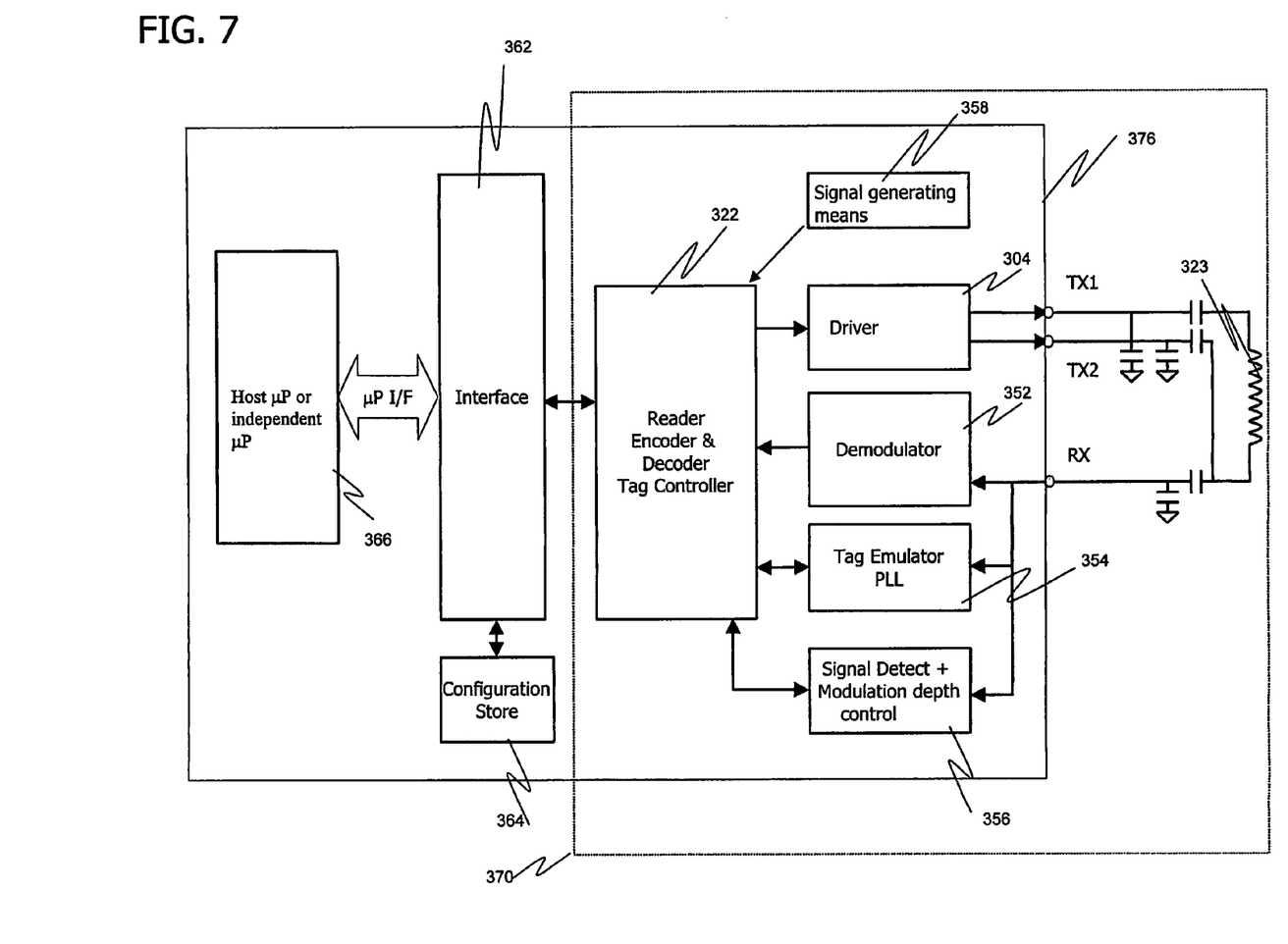
FIG. 7 is a circuit diagram of an apparatus as used within a larger device.

FIG. 7 is a circuit diagram of an RFID apparatus in accordance with an embodiment of the invention, as used within a larger device.

The larger device 376 may, for example, be a mobile telephone terminal. The apparatus may be integrated into such larger device either as a stand-alone unit in similar form to that described above or in such a way that pre-existing mobile telephone components are used and duplication of function avoided, or alternatively as a silicon block within the main device body. Integrating the apparatus of the present invention into such a larger device would allow such a device to operate both as an RF reader and as a tag in the vicinity of other RF reader. Where the larger device 376 is a mobile telephone, when the apparatus is operating in reader mode, the mobile telephone could be used to read tags within objects such as posters and, for example download information or sound tracks from such posters. When operating in tag emulation mode, the mobile telephone could act as an authorisation means such as a train ticket. The mobile telephone would be 'read' by an RF reader, such as a station entrance gate and bring about operation of the entrance gate.

Other examples of the larger device could be a personal computer device or personal digital assistant (PDA) again acting in reader mode to read external RF tags and in tag mode when in range of a second RF reader (for example a station entrance gate), vending machines in which reader and tag emulation are required (for example operating in reader mode when a user wishes to buy an item from the vending machine and tag mode when the owner of the vending machine wishes to download purchasing data), watches acting in similar fashion to mobile telephone terminals or personal computer devices, hand held identification devices and electronic tickets (this would enable the user to both have an identification source in tag emulation mode and reading ability when in reader mode), access and entry systems (in which reader mode is used to read entry by, for example visitors, and then tag emulation mode when download of access information and data is required), medical and diagnostic systems (for example patient identification wristbands in which reader mode is used to read RF tags on drug vials or medication systems and tag emulation mode is used to provide an audit trail and to identify the patient).

In FIG. 7 the RFID apparatus is represented within dotted block 370. It is assumed in this embodiment that the required processing power for the apparatus 370 will be provided by either a host processor or independent processor. Alternatively, the apparatus may have its own microprocessor as previously described. In FIG. 7, the microprocessor within the apparatus is therefore replaced by what is referred to as the "reader, encoder & decoder tag controller" (or simply "controller" below) 322 and represents those parts of the apparatus architecture which can not be found within the pre-existing larger device system. For example the controller may control the timing of operations conducted in the RFID apparatus 370, for example the time of modulation or demodulation (for example because the larger device processor is engaged elsewhere), routing of signals (for example from the Tag emulator PLL 354 to the Driver 304), modulation of both internally generated VCO signal and RF carrier signal (alternatively modulation may occur within the driver 304), switch function for phase lock loop functionality (corresponding to element 216 in FIG. 6). The signal detection and modulation depth control part 356 detects the characteristics of an incoming RF signal and provides a signal to the controller 322 which then performs the function of the modulation controller (corresponding to element 106 in FIG. 4 and element 206 on FIG. 5) either itself or through the host processor or independent processor. The tag emulator phase lock loop (PLL) 354 provides the generating means for tag emulation. The internally VCO generated RF signal produced by the phase lock loop feeds in to the controller for modulation and onwards transmission. The demodulator 352 takes any incoming externally generated RF signal and demodulates such signal to obtain data and/or commands. The driver 304 and signal generating means 358 perform the same functions as previously described (corresponding to elements 104 and 150, respectively, in FIG. 3). The RFID apparatus operates in similar fashion to the embodiments described above.

The RFID apparatus interfaces to the larger device through an interface 362. The interface translates the signals sent between the apparatus and host device so that both parts of the overall system can inter-operate. This interface may form part of the apparatus or be a separate component within the larger host device. The configuration store 364 operates to allow setting of certain parameters or protocols within the apparatus. The configuration store can operate through the interface 362. Alternatively it may be connected directly to the various component parts of the apparatus and act directly on such component parts. Further it may also form part of the host device processor, in which case interpretation/action will occur through the controller 322.

In FIG. 7 the processing capability is either provided through the pre-existing host processor or through an independent microprocessor.

Figure 8:
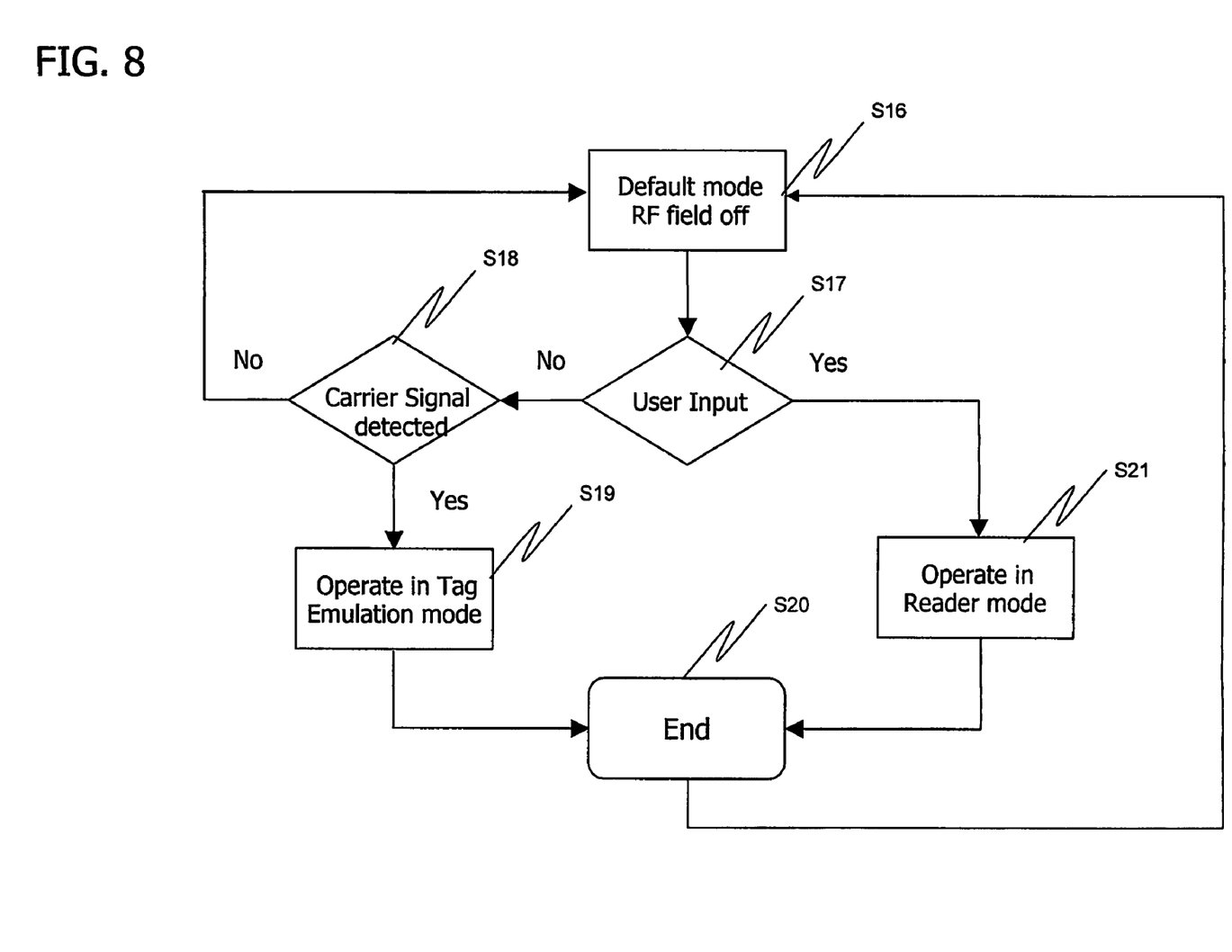
FIG. 8 is a flow diagram describing the mode of operation of an apparatus within a larger device.

FIG. 8 is a flow diagram describing an example of the operation of the device illustrated in FIG. 7.

The RFID apparatus of the mobile telephone terminal is initially set in a default mode, step S16, in this case tag emulation mode, i.e. no RF signal is being transmitted. It is first determined if a user input is detected, step S17. This may be as a result of the mobile telephone user selecting RF reading capability by button selection on the main body of the mobile telephone device, for example they wish to 'read' a data supply device on a poster. Should such occur then the telephone microprocessor will signal the apparatus and the apparatus will switch to operation in reader mode (S21). The apparatus will then operate in a reader mode for the duration required or for a set time period, step S21. At conclusion of duration required (for example user turns reader function off) or reading time expires, the apparatus reverts to tag emulation mode (S16). If there is no mobile telephone user input detected, the apparatus continues to operate in tag emulation mode until a suitable RF signal is detected. If a carrier signal is detected, corresponding for example to the case where the mobile acts as a train ticket and the station entrance gate includes an RF reader, the apparatus operates as a tag and responds to the received RF signal according to its available data and/or command set.

The above embodiments are to be understood as illustrative examples of the invention. Further embodiments of the invention are envisaged. For example, the proposed solution may also be used with other forms of antenna or with multiple antennas, and other coupling mechanisms, such as far field electromagnetic, acoustic or optical. Other examples of phase coherent detection or phase sensitive detection systems would include but are not limited to injection locking receiving circuitry, parametric amplifying receiving circuitry and delay lock loop receiving circuitry. Applications in other electronic devices other than mobile telephones are also envisaged, such as PDAs, laptops, game consoles, electronic wallets or purses, vending machines, watches, identity (ID) devices, electronic ticket devices, access and entry systems, patient identification devices or medical devices.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. RFID apparatus with an antenna, the RFID apparatus having a reader mode of operation and a tag emulation mode of operation, comprising:
   a transmitter operative to transmit a first RF signal via the antenna to an external tag device when the apparatus is in the reader mode;
   a receiver operative to receive a second RF signal from the external tag device via the antenna; and
   a tag emulation generator operative to generate a third RF signal dependent upon characteristics of an incoming fourth RF signal received from an external reader device, and transmit the generated third RF signal using the antenna to the external reader device when the apparatus is in the tag emulation mode, wherein the tag emulation generator includes a phase locked loop having an oscillator and a phase detector, wherein the phase detector is configured to continue to operate when the apparatus is in the reader mode.

2. RFID apparatus according to claim 1, wherein said generator comprises a phase sensitive detection system responsive to phase in said incoming fourth RF signal.

3. RFID apparatus according to claim 1, wherein the phase locked loop is a second order loop.

4. RFID apparatus according to claim 1, wherein the phase locked loop comprises a loop filter.

5. RFID apparatus according to claim 1, wherein the phase locked loop comprises a sample and hold circuit.

6. RFID apparatus according to claim 1, wherein said apparatus is arranged to modulate said third RF signal prior to transmission of said third RF signal.

7. RFID apparatus according to claim 1, wherein the reader and/or tag emulation mode of operation is independently selectable.

8. RFID apparatus according to claim 7, wherein the mode of operation is selected in dependence on detection of an externally generated RF signal.

9. RFID apparatus according to claim 1, wherein the apparatus has a default mode of operation, and wherein the default mode of operation is said reader mode of operation.

10. RFID apparatus according to claim 1, wherein the apparatus has a default mode of operation, and wherein the default mode of operation is said tag emulation mode of operation.

11. RFID apparatus according to claim 1, wherein said apparatus comprises said antenna used commonly to both receive said modulated RF signal and to transmit said generated RF signal.

12. RFID apparatus according to claim 11, wherein said antenna comprises an inductive coupling antenna.

13. RFID apparatus according to claim 1, wherein said apparatus comprises a modulator operative to modulate a carrier signal.

14. An electrical device incorporating an RFID apparatus according to claim 1.

15. An electrical device according to claim 14, wherein such electrical device is a mobile communications device, personal computer device, electronic wallet or purse, a vending machine, a watch, an ID device, an electronic ticket device, an access and entry system, a patient identification device or a medical device.

16. RFID apparatus according to claim 1, wherein the generated third RF signal interferes with the incoming fourth RF signal.

17. Radio frequency (RF) apparatus with an antenna, the RF apparatus having a reader mode of operation and a tag emulation mode of operation, comprising:
   a tag emulating circuit operative to respond to an external radio frequency reader apparatus when the apparatus is in the tag emulation mode, wherein the tag emulation generator includes a phase locked loop having an oscillator and a phase detector, wherein the phase detector is configured to continue to operate when the apparatus is in the reader mode; and
   a reader circuit operative to operate as a radio frequency reader device when the apparatus is in the reader mode, wherein the tag emulating circuit and the reader circuit share the antenna.

* * * * *